(12) United States Patent  
Sunaga

(10) Patent No.: US 7,768,439 B2  
(45) Date of Patent: Aug. 3, 2010

(54) DATA TRANSMISSION SYSTEM

(75) Inventor: Kazuhisa Sunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 328 days.

(21) Appl. No.: 12/066,039

(22) PCT Filed: Aug. 11, 2006

(86) PCT No.: PCT/JP2006/315917

§ 371 (c)(1),  
(2), (4) Date: Mar. 6, 2008

(87) PCT Pub. No.: WO2007/029449

PCT Pub. Date: Mar. 15, 2007

(65) Prior Publication Data

US 2009/0102536 A1  Apr. 23, 2009

(30) Foreign Application Priority Data

Sep. 7, 2005  (JP) ............................. 2005-259354

(51) Int. Cl.  
*H03M 1/12* (2006.01)

(52) U.S. Cl. ................... 341/173; 341/50; 341/51  
(58) Field of Classification Search ............ 341/50, 341/51, 171  
See application file for complete search history.

(56) References Cited

U.S. PATENT DOCUMENTS

| 5,313,203 | A  | * | 5/1994  | Suu et al. ............... 341/50 |
| 5,825,313 | A  | * | 10/1998 | Kondo et al. ............ 341/67 |
| 6,614,366 | B2 | * | 9/2003  | Luby .................... 341/50 |
| 6,747,580 | B1 | * | 6/2004  | Schmidt ................. 341/50 |
| 6,952,570 | B2 | * | 10/2005 | Nagayasu ............... 455/208 |
| 2005/0058293 | A1 | * | 3/2005 | Higurashi ............... 380/274 |

FOREIGN PATENT DOCUMENTS

| JP | 61-100058 A    | 5/1986  |
| JP | 04-336767 A    | 11/1992 |
| JP | 05-268273 A    | 10/1993 |
| JP | 2000-068851 A  | 3/2000  |
| JP | 2003-078574 A  | 3/2003  |
| JP | 2003-249966 A  | 9/2003  |
| JP | 2004-030797 A  | 1/2004  |

* cited by examiner

*Primary Examiner*—Jean B Jeanglaude  
(74) *Attorney, Agent, or Firm*—Sughrue Mion, PLLC

(57) ABSTRACT

A data transmission system is made up from: a transmission circuit (100) for generating and transmitting a data sequence in which the abundance ratio of each value for each prescribed data length is fixed, and a reception circuit (101) for, based on the abundance ratio of each value of a data sequence transmitted from the transmission circuit (100), correcting the offset voltage of a signal detection circuit (3) that detects values of the data sequence.

17 Claims, 17 Drawing Sheets

[Fig. 1]
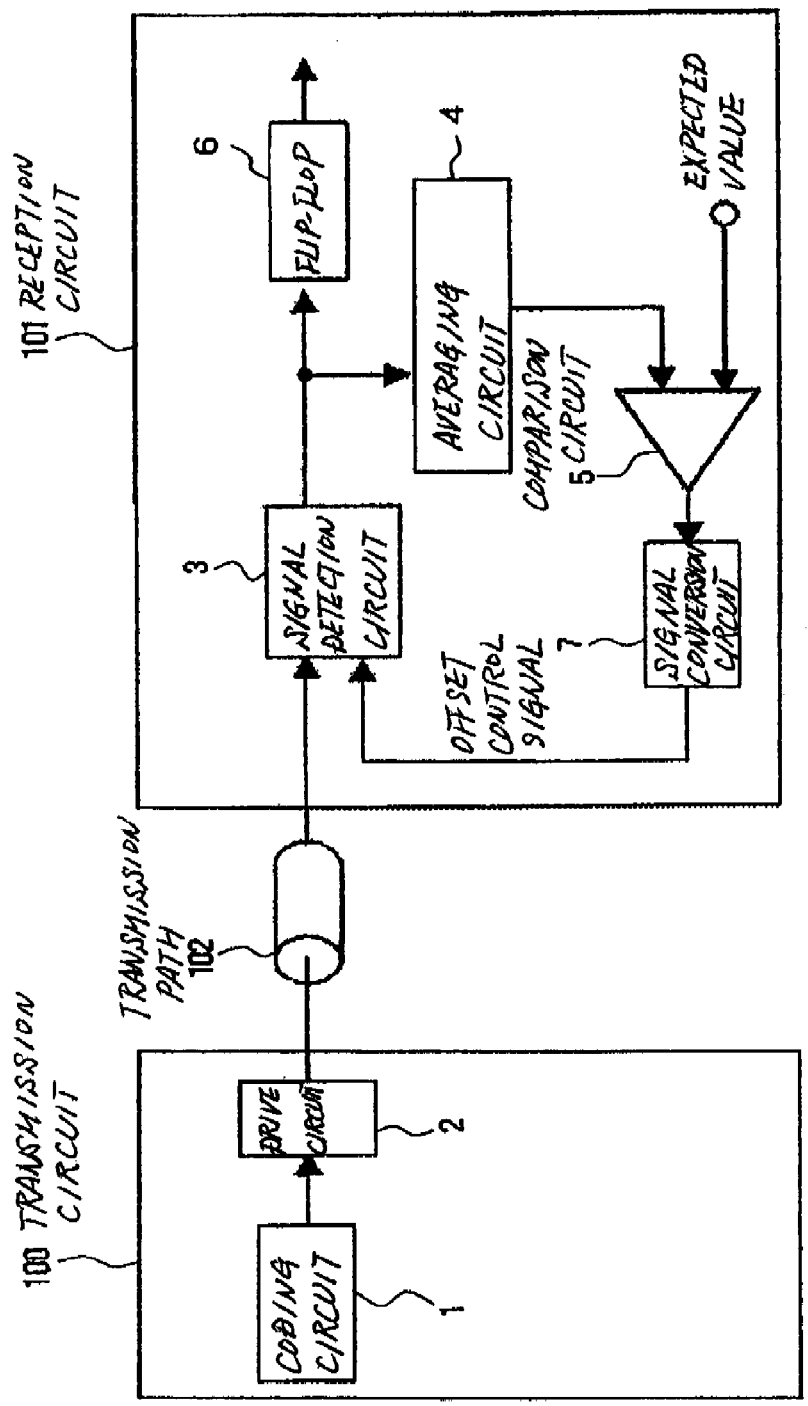

[Fig. 2A]
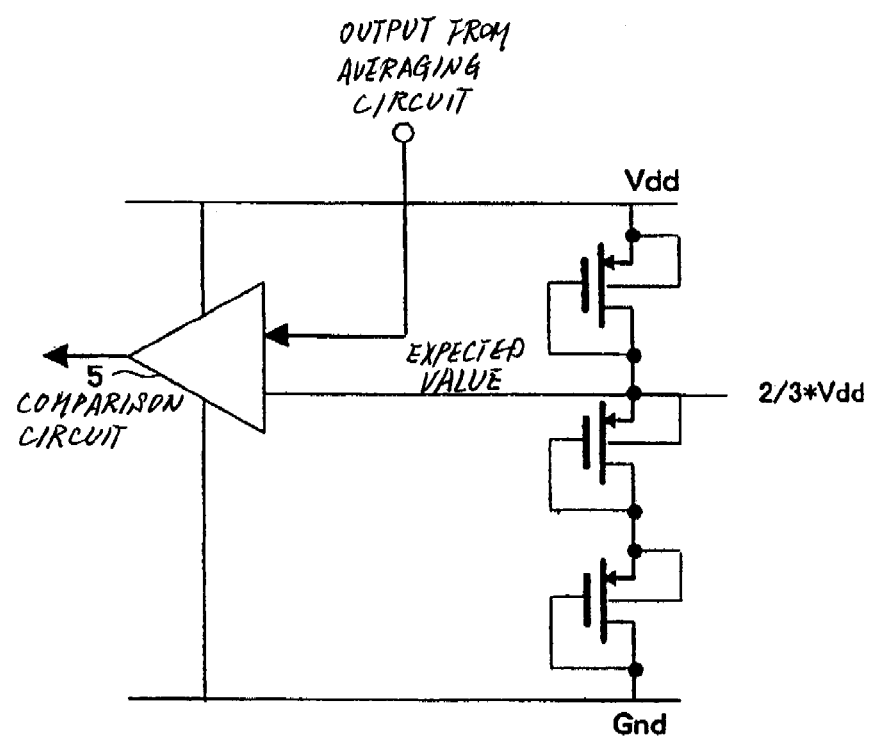

[Fig. 2B]
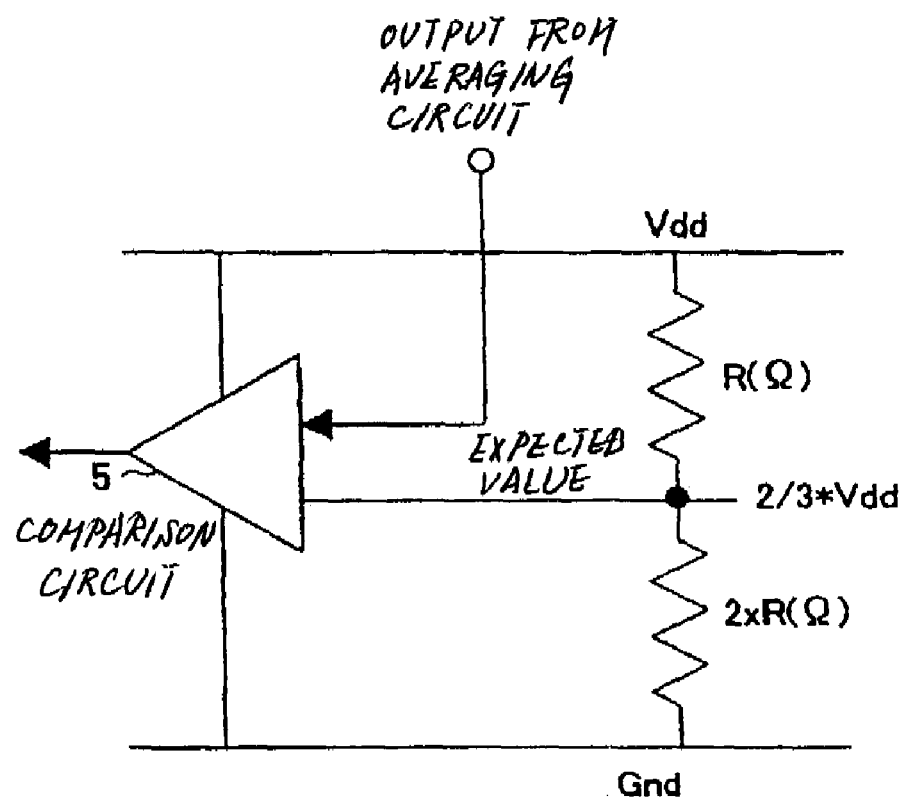

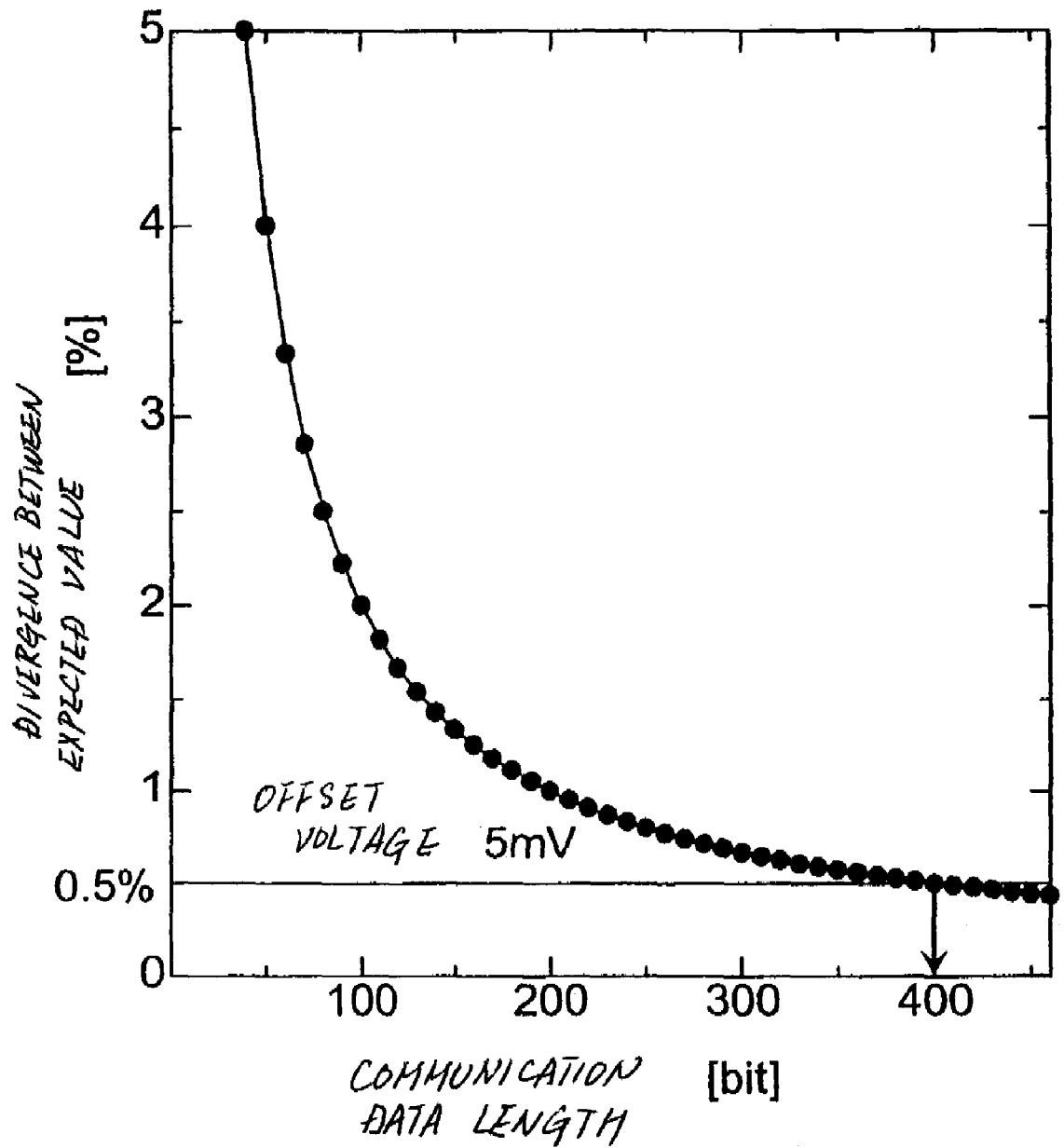
[Fig.3]

[Fig.4]
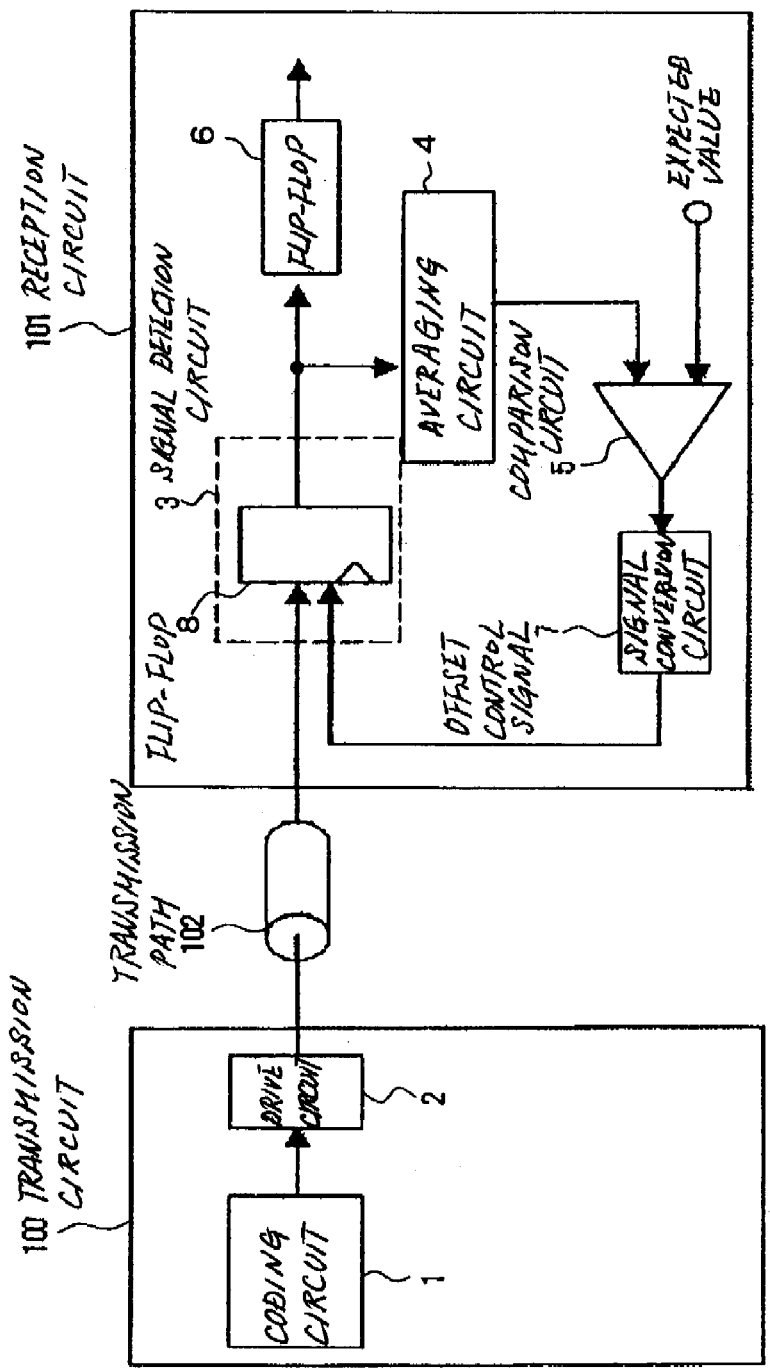

[Fig. 5]
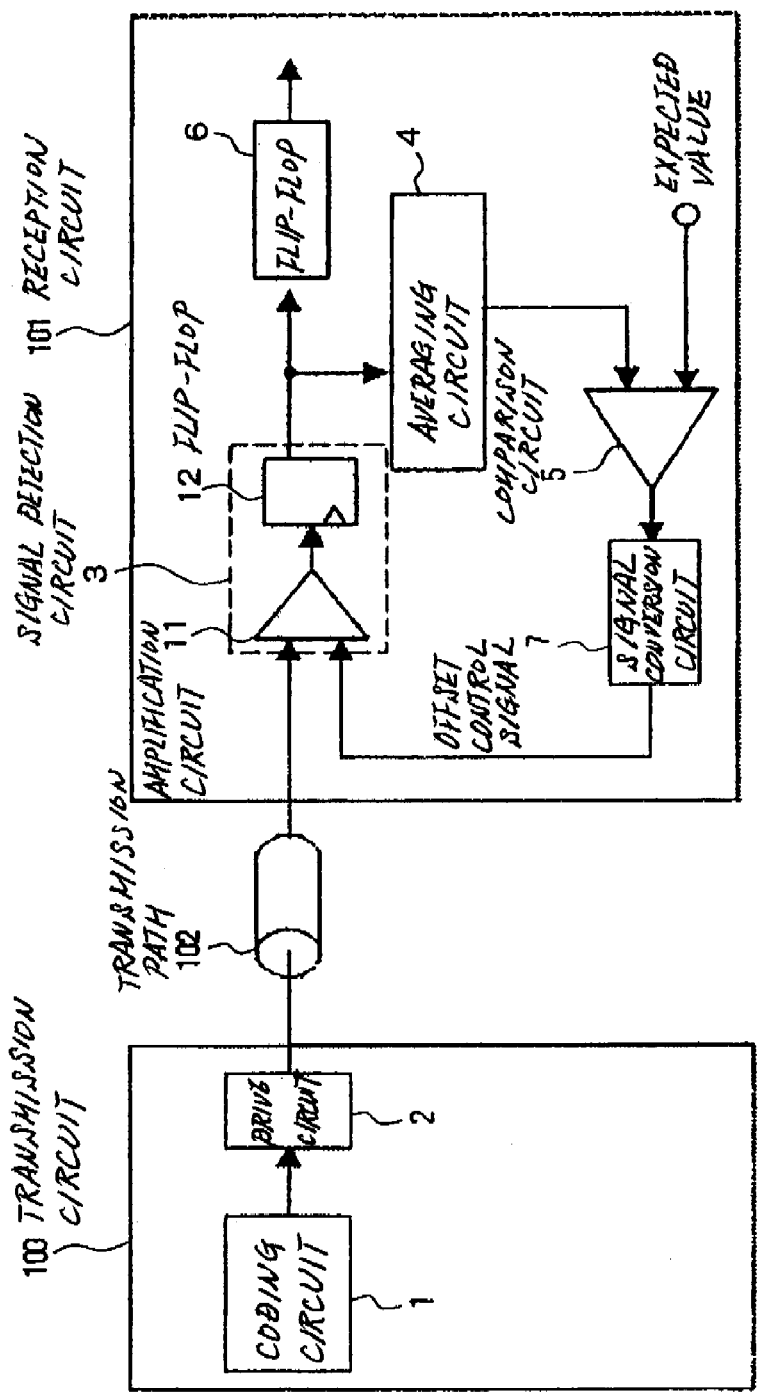

[Fig.6]
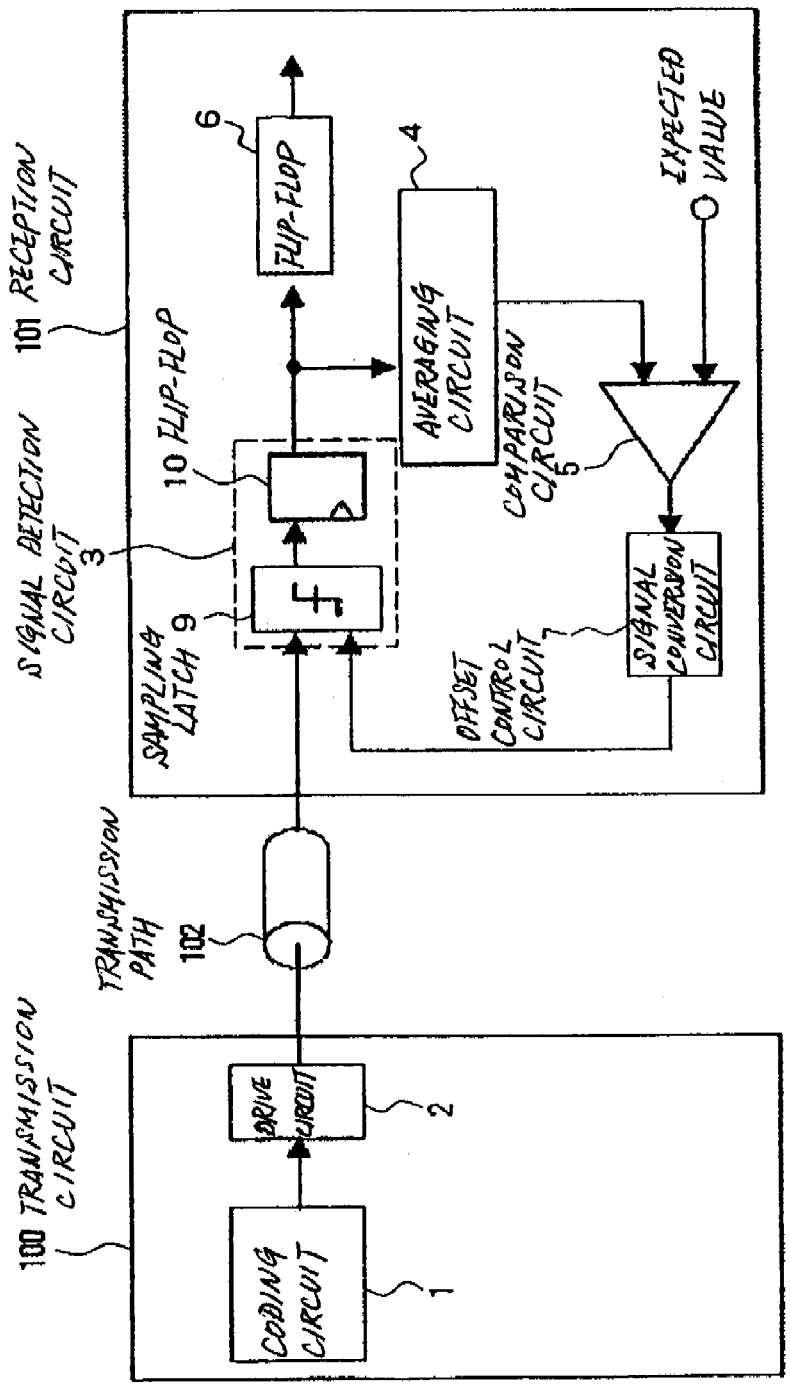

[Fig.7]
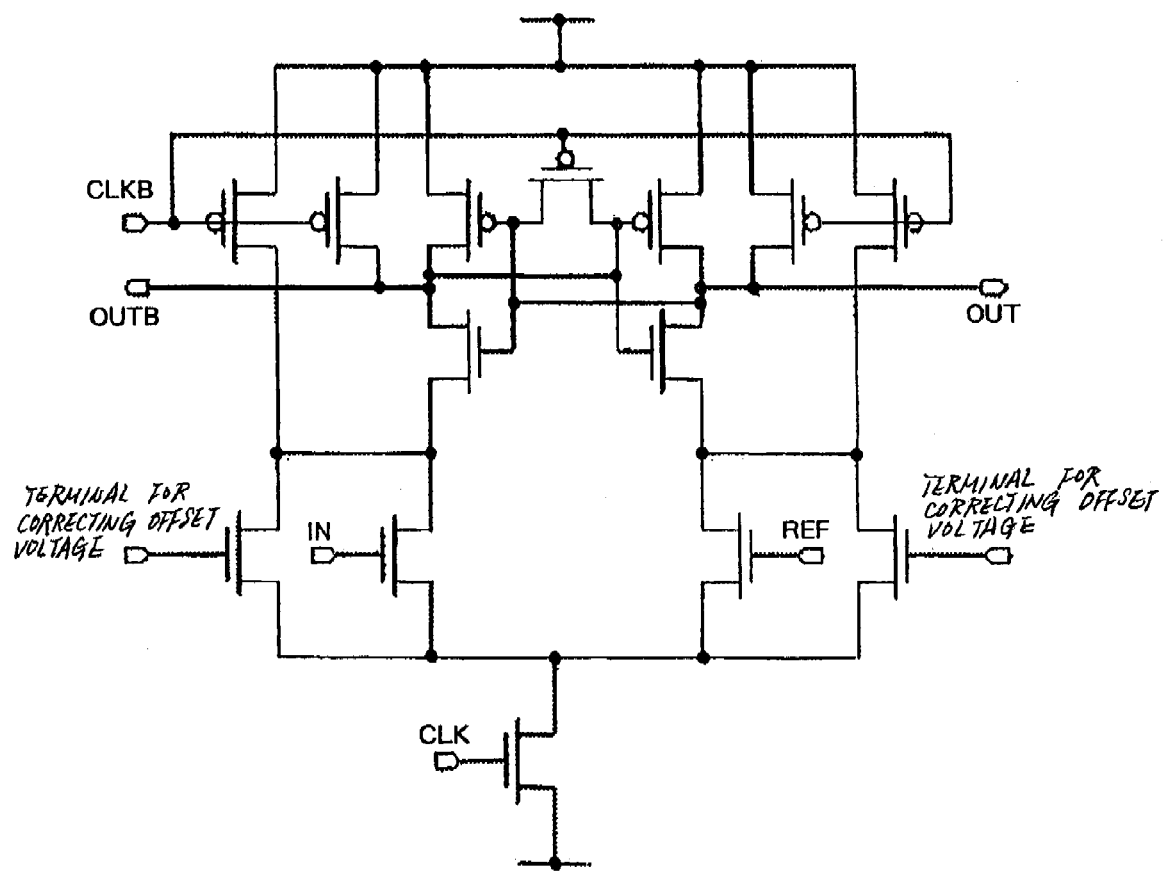

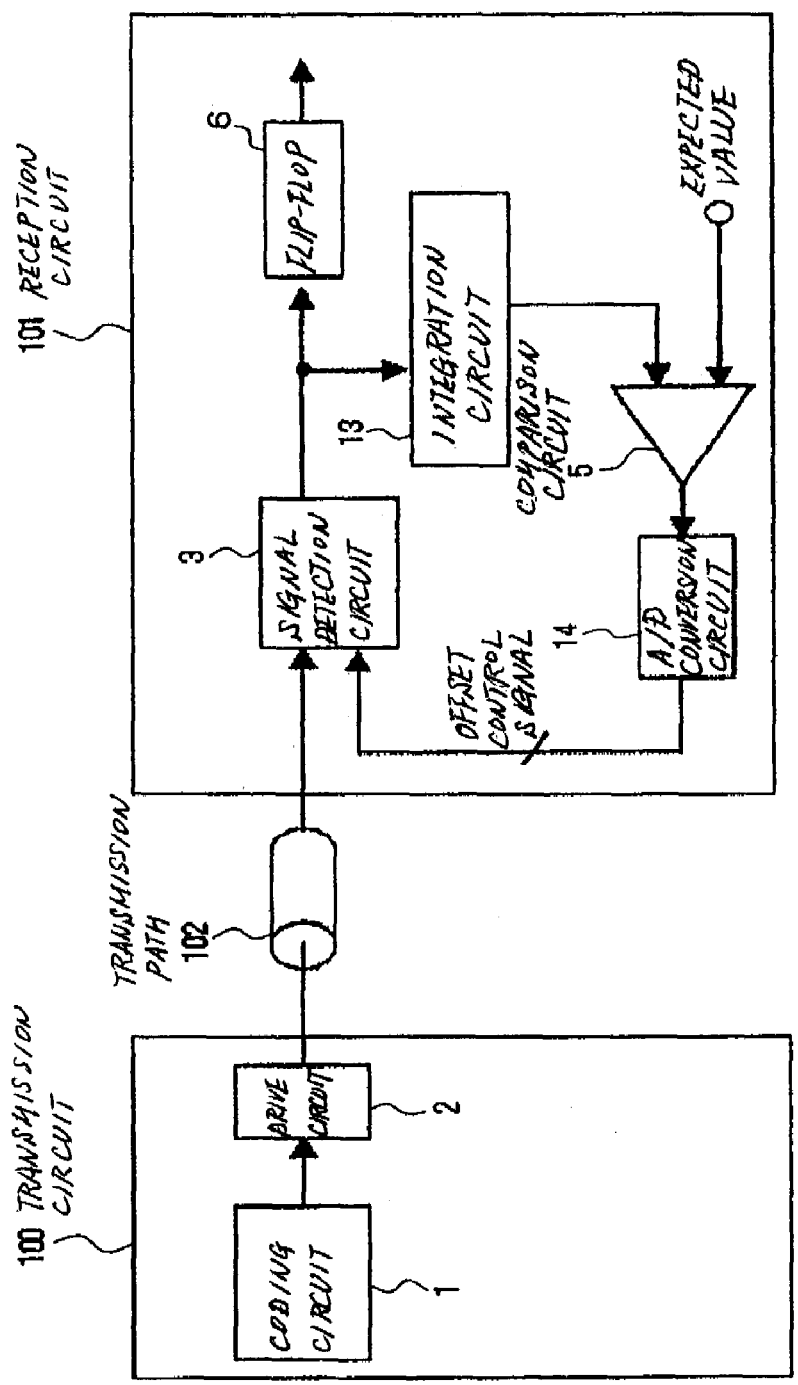
[Fig. 8]

[Fig. 9]
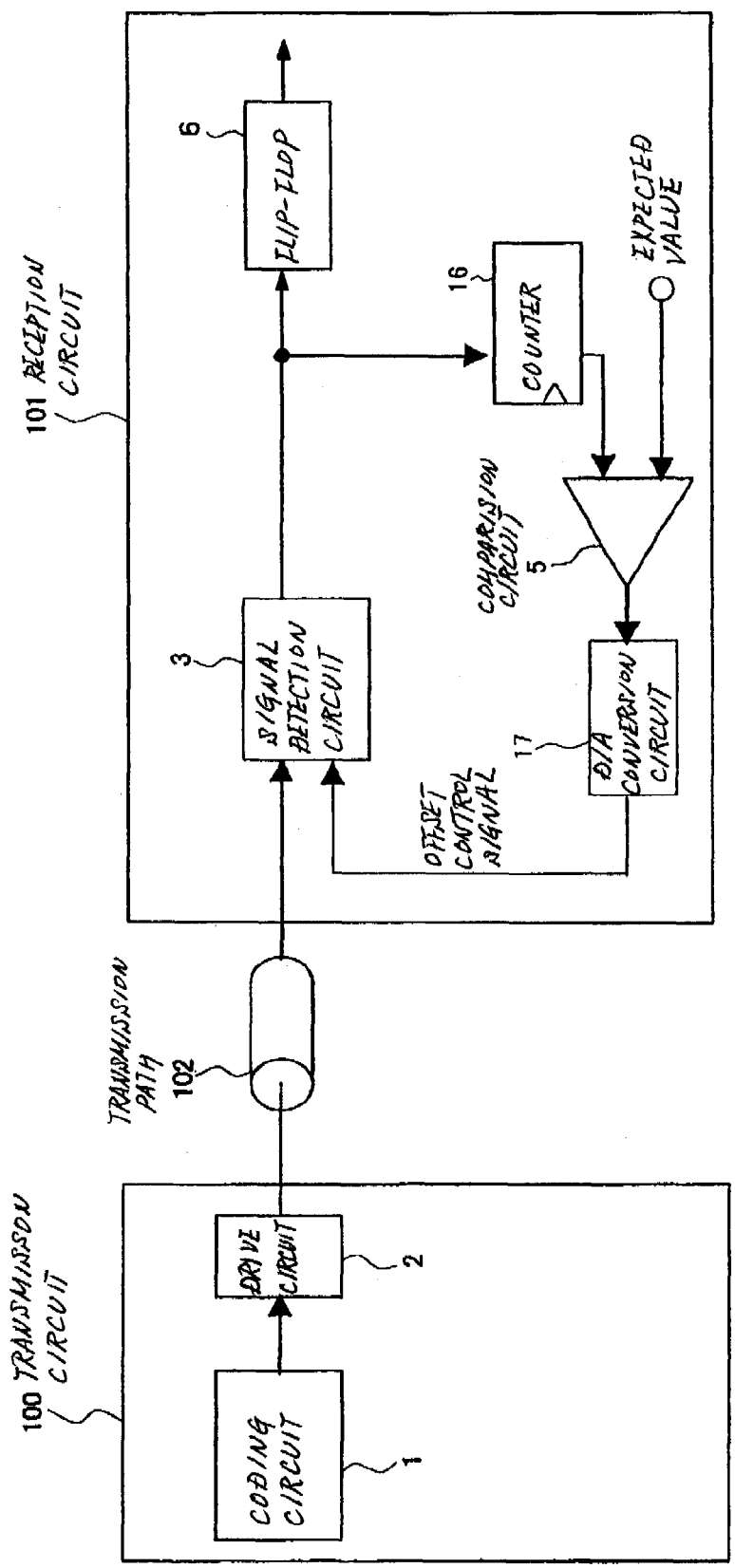

[Fig. 10]
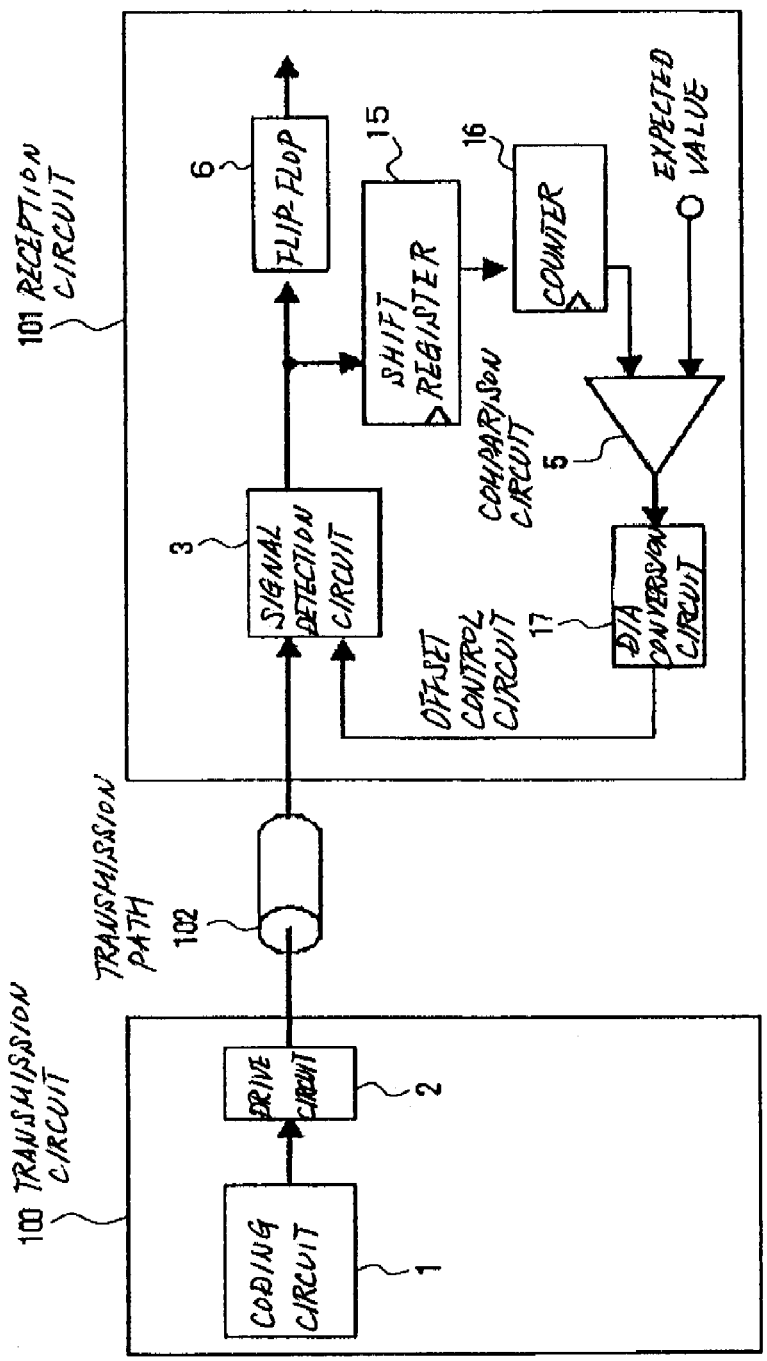

[Fig. 11]
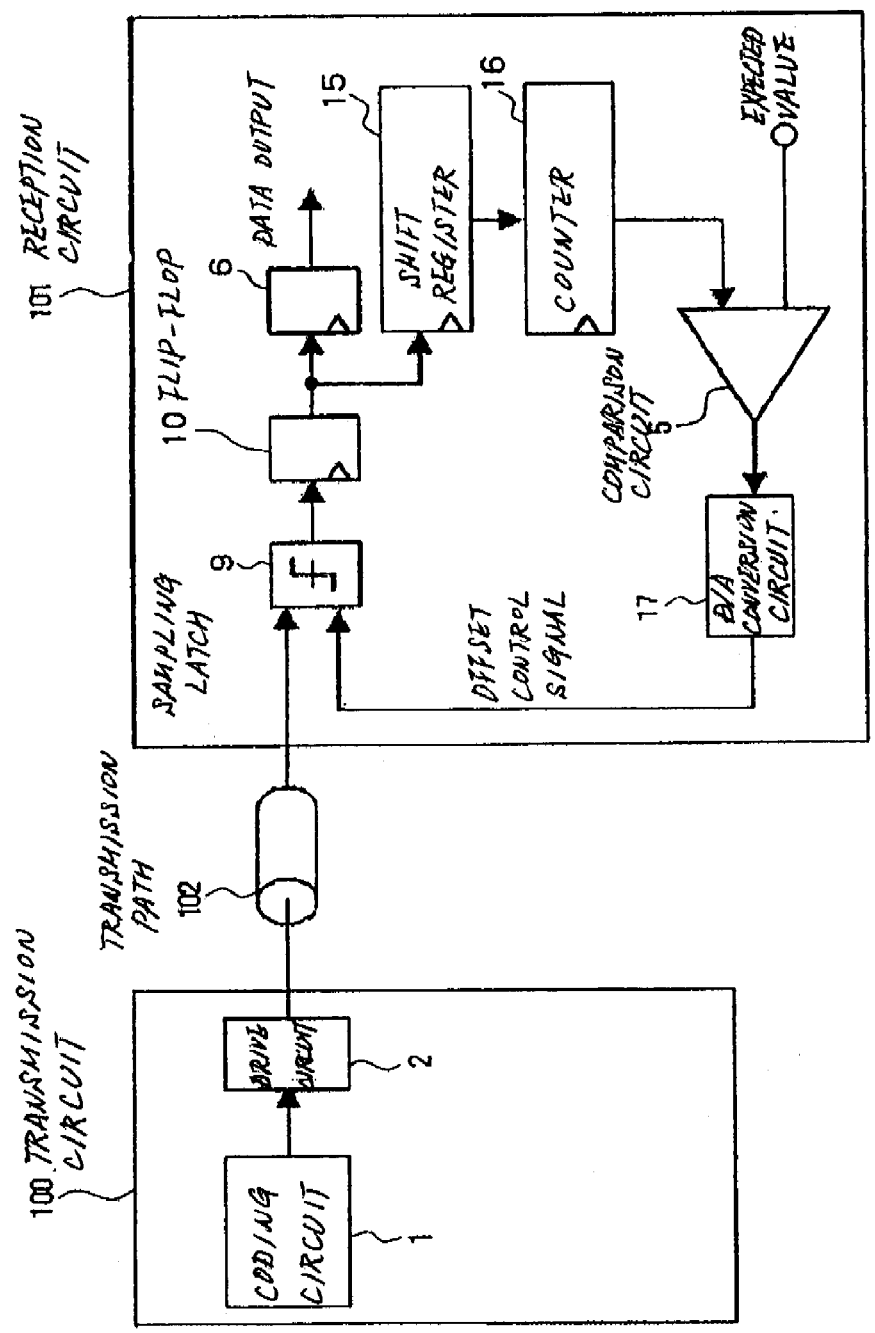

[Fig. 12]
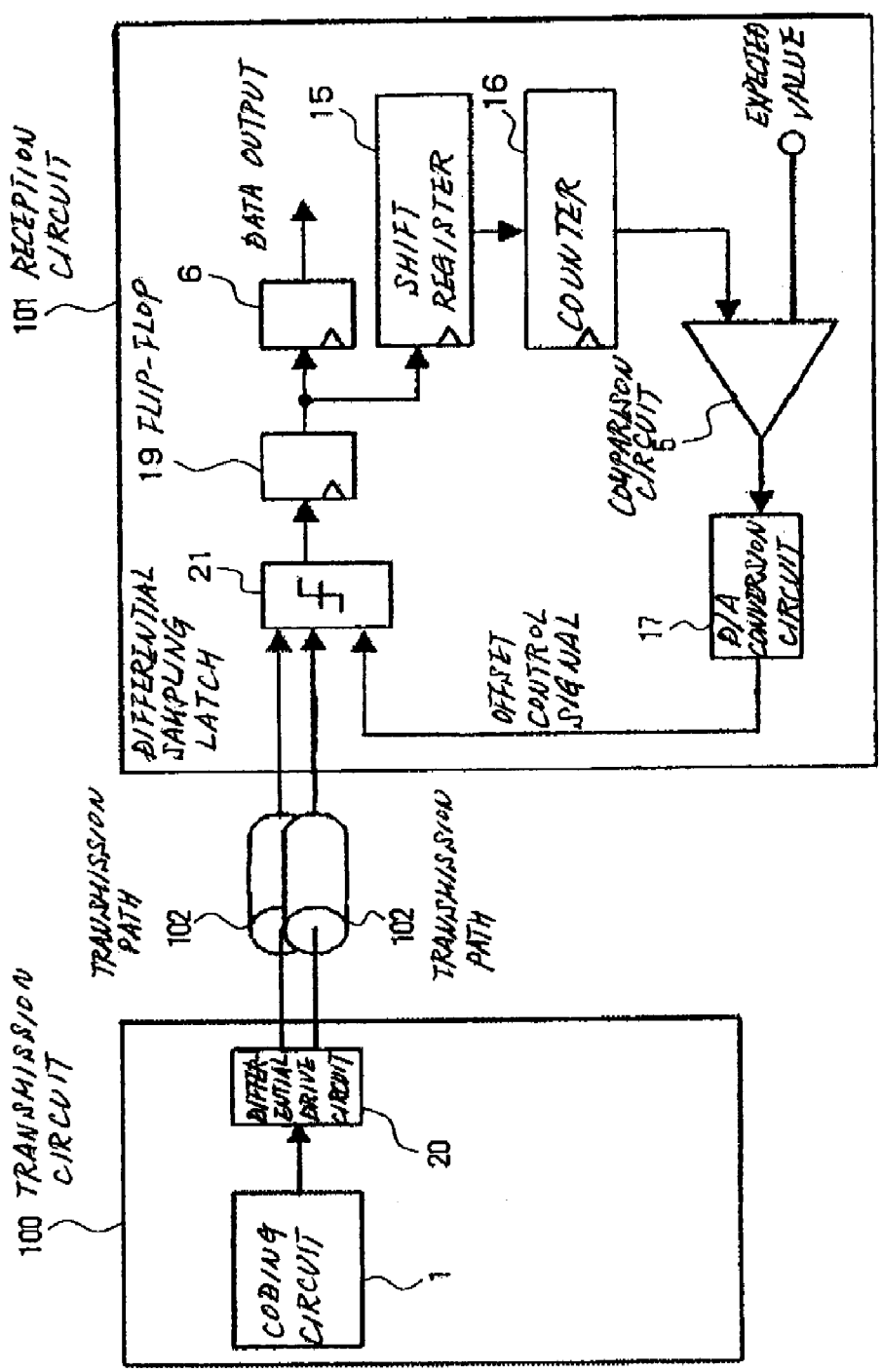

[Fig. 13]
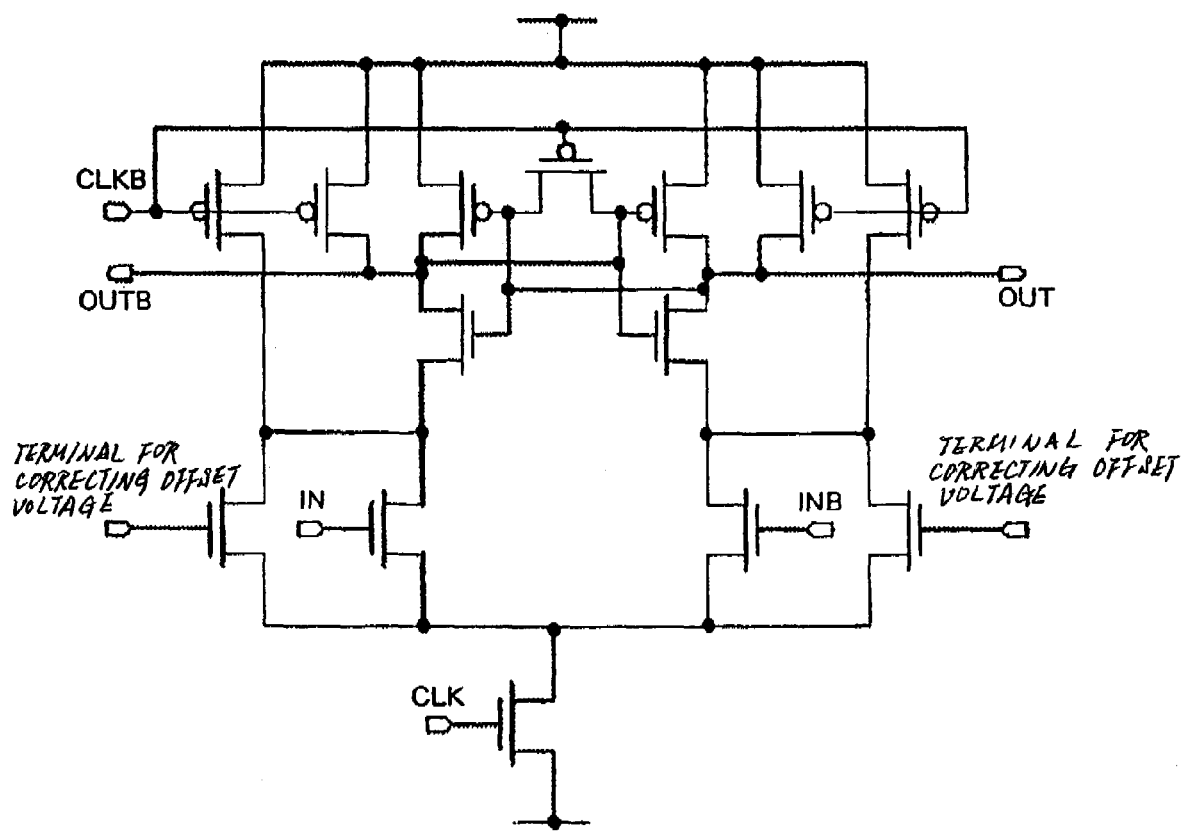

[Fig. 14]
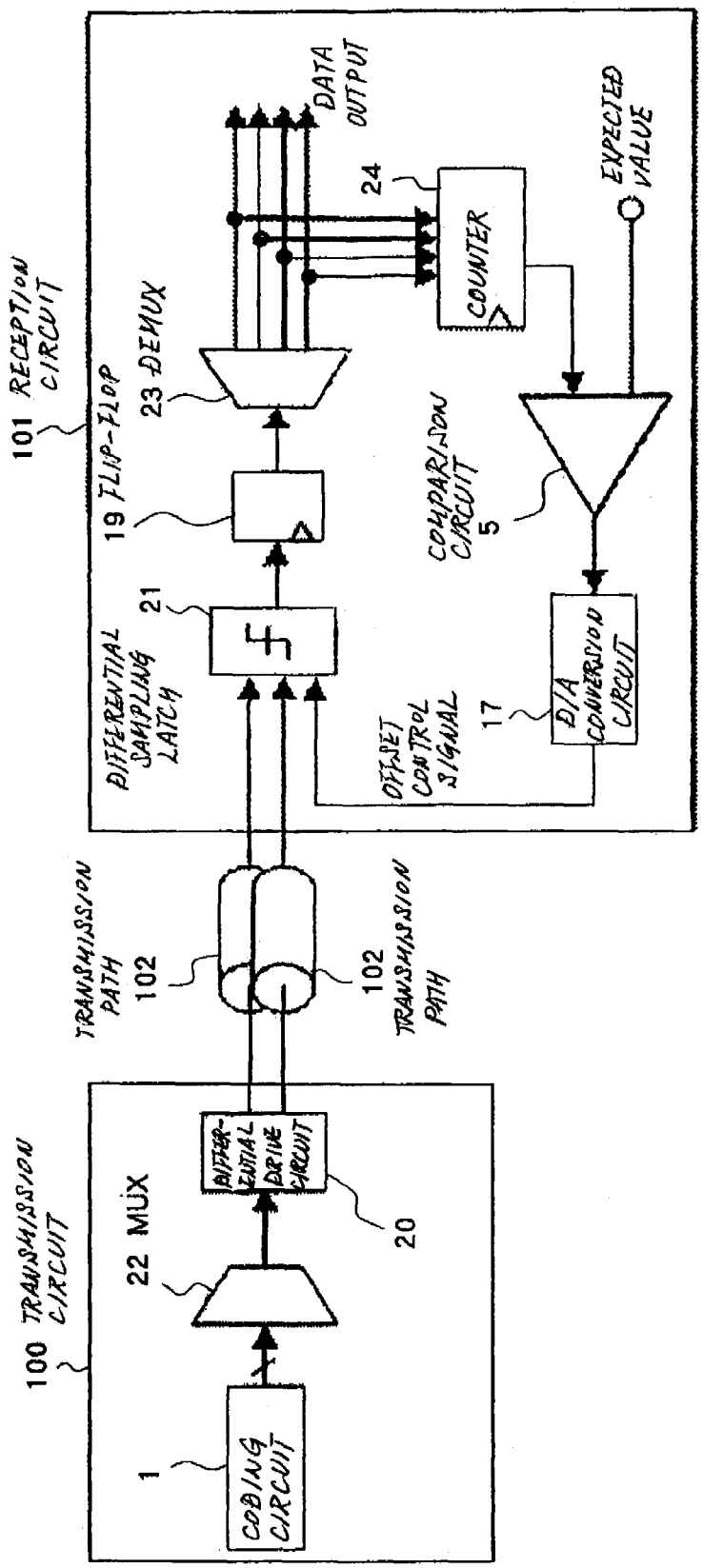

[Fig. 16]
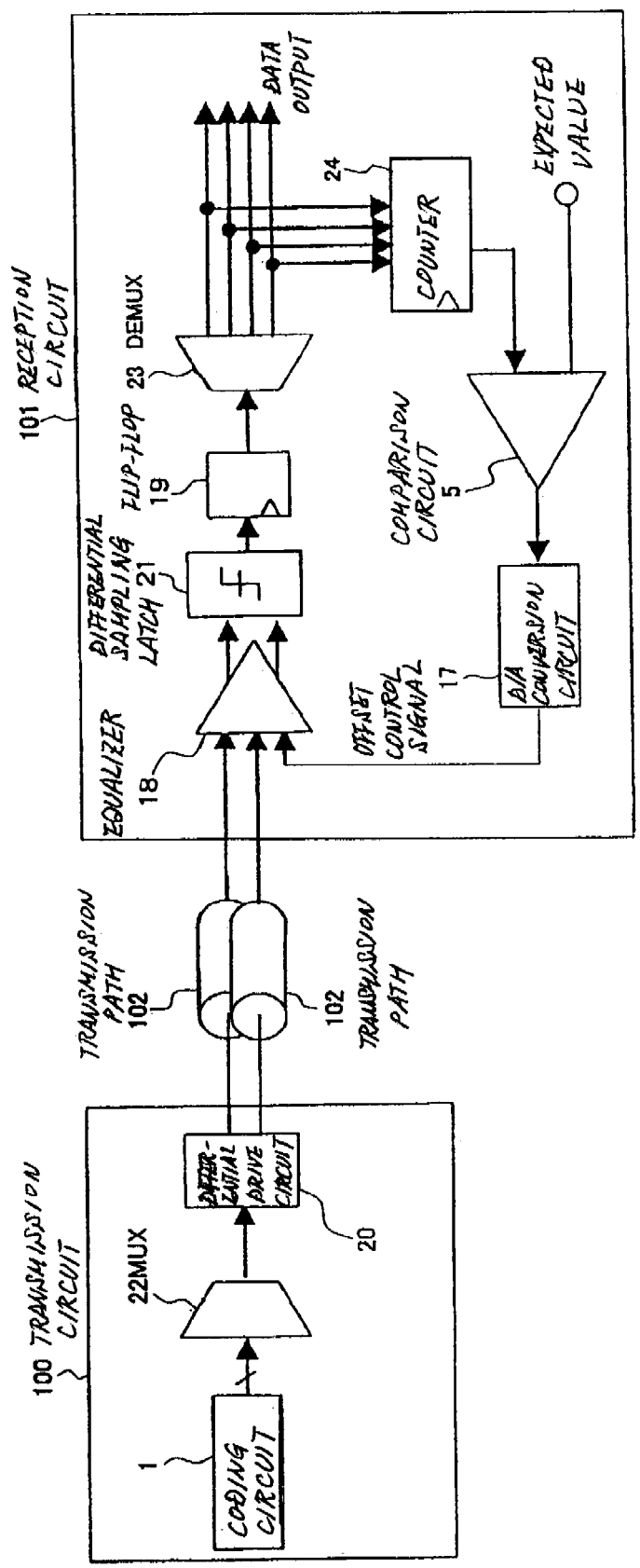

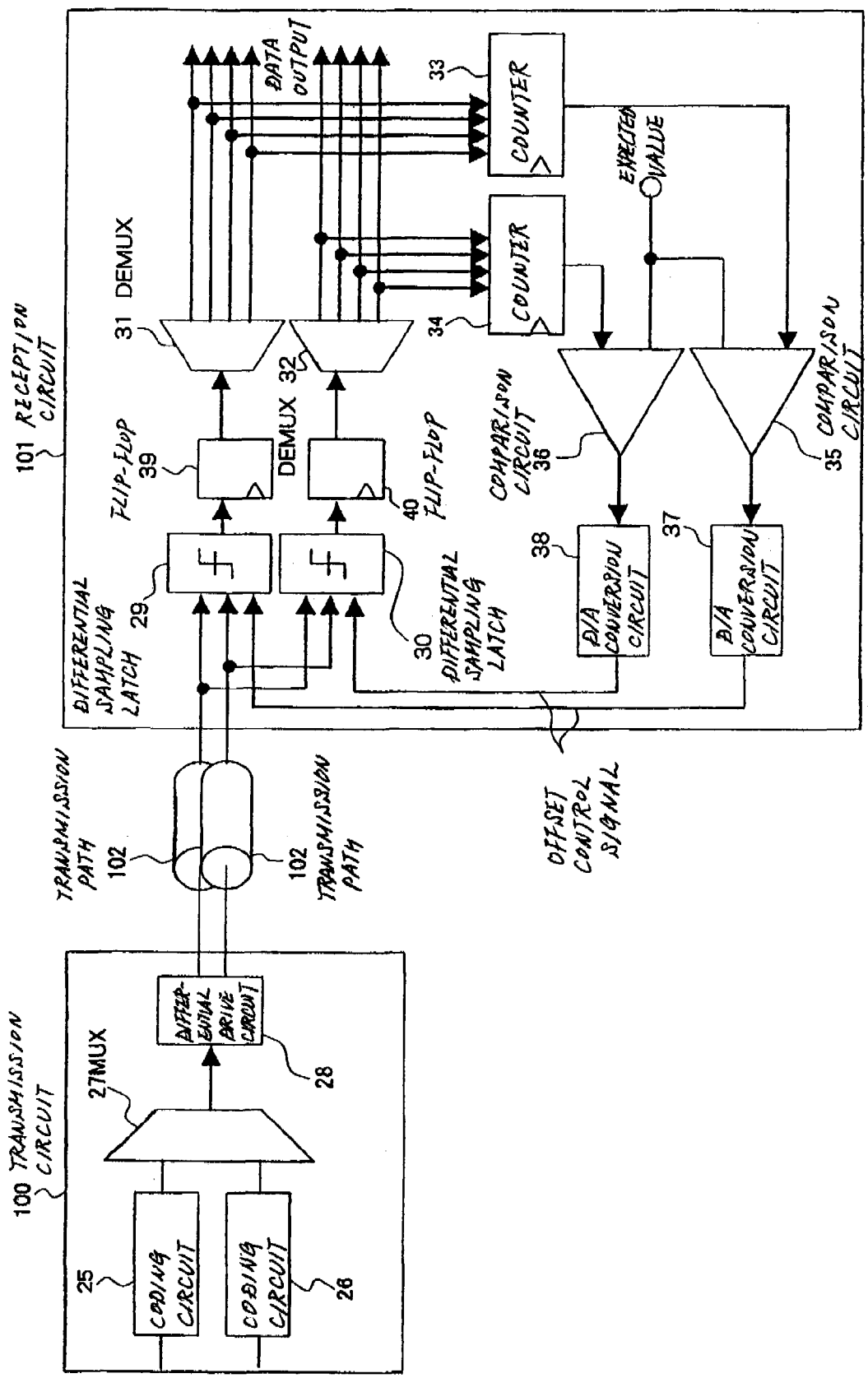
[Fig. 16]

DATA TRANSMISSION SYSTEM

CROSS-RELATED REFERENCE APPLICATIONS

This application is a 371 of PCT/JP2006/315917 filed on Aug. 11, 2006, which claims the benefit of foreign priority of Japanese Patent Application Number 2005-259354, filed on Sep. 7, 2005.

TECHNICAL FIELD

The present invention relates to a data transmission system provided with a signal detection circuit for detecting, from a signal received by way of a transmission path, data contained in the signal.

BACKGROUND ART

A plurality of transistors that have been produced on the same silicon chip have all been produced under exactly the same conditions and therefore have characteristics such as threshold voltage and mutual conductance that are essentially matched. As a result, a balanced-input circuit that uses transistors is ideal for detecting a microsignal, and components such as differential amplification circuits and differential sampling latch circuits are frequently used in the input stage of a signal detection circuit for detecting data of a received signal.

However, variation occurs in characteristics such as the threshold voltage or mutual conductance of actual transistors. These variations in characteristics arise from temperature differences within a chip or from various fabrication steps such as ion implantation, diffusion, or patterning that employs photoresist, or result from statistical variations.

When these variations in characteristics occur in a signal detection circuit, all of the variations are combined and appear as offset voltage. The minimum input difference in potential that can be detected by a signal detection circuit is determined by this offset voltage.

In wired communication in recent years, the amplitude of received signals has decreased markedly with the higher data transmission speeds, and there is a trend for the difference in potential of signals that are applied to signal detection circuits to further decrease as communication speeds increase.

As previously described, the input difference in potential that can be detected in a signal detection circuit is determined by the offset voltage, and the problem therefore arises that the false detection rate of data of low-amplitude high-speed received signals is exacerbated by the offset voltage.

The invention disclosed by Japanese Patent Laid-Open No. 2004-030797 is one known means of the related art for correcting the offset voltage of a signal detection circuit.

The signal detection circuit described in Japanese Patent Laid-Open No. 2004-030797 includes a training sequence (adjustment pattern) generation circuit for adjusting offset voltage whereby a data sequence generated in the training sequence generation circuit during the operation of system initialization is applied as input to a signal detection circuit, the data sequence applied as input to the signal detection circuit is compared with the data sequence detected in the signal detection circuit in bit units, and the offset voltage of the signal detection circuit then adjusted based on the detection results of bit errors.

However, the configuration described in Japanese Patent Laid-Open No. 2004-030797 requires a training sequence (adjustment pattern) generation circuit that is dedicated to the correction of the offset voltage of the signal detection circuit.

There is a further problem that the self-test for correcting the offset voltage of the above-described signal detection circuit is implemented during operations for system initialization, and correction therefore cannot be realized for fluctuations of the offset voltage generated by such factors as the temperature fluctuations during use of the system. One solution that can be considered for this problem is the implementation of self-testing periodically or according to necessity after the start of data communication. However, the implementation of self-testing prevents the reception of signals in the signal detection circuit and the inability to send information results in a decrease of the effective communication speed.

DISCLOSURE OF THE INVENTION

It is an object of the present invention to provide a data transmission system that can correct offset voltage while receiving signals.

In the present invention a data transmission system for achieving the above-described object includes: a transmission circuit for generating and transmitting a data sequence in which the abundance ratio of each value for each prescribed data length is fixed, and a reception circuit for, based on the abundance ratio of each value of the data sequence transmitted from the transmission circuit, correcting the offset voltage of a signal detection circuit that detects each of the values.

The transmission circuit is provided with, for example, a coding circuit for encoding any data sequence for each prescribed data length and generating a data sequence in which the abundance ratio of each value for each prescribed data length is fixed. The reception circuit is provided with a comparison circuit for comparing the abundance ratio of each value of the data sequence supplied as output from the signal detection circuit and an expected value that is based on the abundance ratio of each value of the data sequence generated in the transmission circuit and for feeding back to the signal detection circuit an offset control signal for causing these values to match.

In a data transmission system such as described hereinabove, the offset voltage of the signal detection circuit is corrected in the reception circuit based on the abundance ratio of each value of the data sequence transmitted from the transmission circuit, as a result, the offset voltage of the signal detection circuit can be corrected while signals are being received. In addition, the offset voltage is corrected using a data sequence that is transmitted, whereby fluctuations in the offset voltage of the signal detection circuit that occur during transmission of data can also be corrected. Still further, increase in the circuit scale or decrease of the communication speed can be prevented because there is no need for circuits for generating a dedicated training sequence or an adjustment pattern for correcting the offset voltage of the signal detection circuit.

BRIEF DESCRIPTION OF THE DRAWINGS

FIG. 1 is a block diagram showing the configuration of the first embodiment of the data transmission system of the present invention.

FIG. 2A is a circuit diagram showing the configuration of the first embodiment of the data transmission system of the present invention and shows an example of the circuit for generating an expected value shown in FIG. 1.

FIG. 2B is a circuit diagram showing the configuration of the first embodiment of the data transmission system of the present invention and shows an example of the circuit for generating an expected value shown in FIG. 1.

FIG. 3 is a graph showing the transition of the divergence of the expected value and the mean potential of a data sequence after encoding with respect to the bit number (communication data length) of a data sequence after encoding by 8B/10B coding.

FIG. 4 is a block diagram showing the configuration of the first embodiment of the data transmission system of the present invention and shows an example in which a flip-flop is used in the signal detection circuit shown in FIG. 1.

FIG. 5 is a block diagram showing the configuration of the first embodiment of the data transmission system of the present invention and shows an example in which an amplification circuit is used in the signal detection circuit shown in FIG. 1.

FIG. 6 is a block diagram showing the configuration of the first embodiment of the data transmission system of the present invention and shows an example in which a sampling latch is used in the signal detection circuit shown in FIG. 1.

FIG. 7 is a circuit diagram showing an example of the configuration of the sampling latch shown in FIG. 6.

FIG. 8 is a block diagram showing the configuration of the first embodiment of the data transmission system of the present invention and shows an example in which an integration circuit is used in the averaging circuit shown in FIG. 1.

FIG. 9 is a block diagram showing the configuration of the second embodiment of the data transmission system of the present invention and shows an example in which a counter is used in the averaging circuit.

FIG. 10 is a block diagram showing the configuration of the second embodiment of the data transmission system of the present invention and shows an example in which a shift register is used in the averaging circuit.

FIG. 11 is a block diagram showing the configuration of the second embodiment of the data transmission system of the present invention and shows an example in which a sampling latch is used in the signal detection circuit and a shift register is used in the averaging circuit.

FIG. 12 is a block diagram showing the configuration of the third embodiment of the data transmission system of the present invention and shows an example in which transmission paths are realized by differential transmission.

FIG. 13 is a circuit diagram showing the configuration of the third embodiment of the data transmission system of the present invention and shows an example of the configuration of a differential sampling latch.

FIG. 14 is a block diagram showing the configuration of the fourth embodiment of the data transmission system of the present invention.

FIG. 15 is a block diagram showing a modification of the data transmission system shown in FIG. 14.

FIG. 16 is a block diagram showing another configuration of the fourth embodiment of the data transmission system of the present invention.

BEST MODE FOR CARRYING OUT THE INVENTION

First Embodiment

As shown in FIG. 1, the data transmission system of the first embodiment includes transmission circuit 100 for encoding and transmitting a data sequence that is the object of transmission and reception circuit 101 that is provided with a signal detection circuit for detecting a data sequence from a received signal.

Transmission circuit 100 is provided with: coding circuit 1 for encoding a data sequence that is the object of transmission and drive circuit 2 for transmitting the encoded data sequence to transmission path 102.

Coding circuit 1 encodes a data sequence that is the object of transmission such that the proportion of each value that exists in each prescribed data length is fixed. For example, in binary transmission, encoding is carried out such that the abundance ratios of the two values "1" and "0" are, for example: 1:1 or 2:1. In quaternary transmission, encoding is carried out such that the abundance ratios of the four values "11," "10," "01," and "00" are, for example: 1:1:1:1 or 3:2:1:2. The configuration or encoding method of coding circuit 1 may be of any form as long as encoding can be carried out such that the abundance ratio of each value after encoding is fixed.

Reception circuit 101 is provided with: signal detection circuit 3; averaging circuit 4 for supplying as output the mean potential of the data sequence that was supplied from signal detection circuit 3; and comparison circuit 5 for comparing the expected value that is based on the abundance ratio of each value of the data sequence generated by transmission circuit 100 with the abundance ratio (output potential of averaging circuit 4) of each value of the data sequence supplied from signal detection circuit 3 and supplying an offset control signal for causing these values to match. Reception circuit 101 feeds back the output signal (offset control signal) of comparison circuit 5 to signal detection circuit 3 to correct the offset voltage of signal detection circuit 3.

Signal conversion circuit 7 is a circuit for converting the output signal of comparison circuit 5 in accordance with the configuration of signal detection circuit 3. For example, if signal detection circuit 3 is of a configuration that receives a digital signal as the offset control signal, signal conversion circuit 7 may be of a configuration for converting the voltage signal to a digital signal. Alternatively, if signal detection circuit 3 is of a configuration that receives a current signal as the offset control signal, signal conversion circuit 7 may be of a configuration for converting the voltage signal to a current signal. When a voltage signal is supplied as output from comparison circuit 5 and signal detection circuit 3 is of a configuration that receives the voltage signal as the offset control signal, signal conversion circuit 7 may be omitted.

A signal detected by signal detection circuit 3 is held by flip-flop 6 and supplied as output to a processing circuit (not shown) belonging to reception circuit 101 in synchronization with, for example, a system clock. In addition, flip-flop 6 is not necessary if the output signal of signal detection circuit 3 does not need to be supplied in synchronization with a system clock.

Explanation next regards the method of correcting the offset voltage in the present invention, taking as an example 8B/10B coding that is chiefly used in coding processes in binary transmission.

8B/10B coding is a coding mode proposed by A. X. Widmer (IBM Journal of Research and Development, Vol. 27, No. 5, pp. 440-451). As one characteristic of 8B/10B coding, data that are transmitted are altered according to a value referred to as "running disparity" that indicates the difference between "1," and "0" in the immediately preceding encoded data length (the processing unit of encoding) to thereby cause the abundance ratio of each value ("1" and "0") of a data sequence following encoding to approach a fixed value. In this case, "1" indicates the higher potential and "0" indicates the lower potential, but "1" and "0" are not absolute values that indicate prescribed potentials.

The mean potential Vex of a data sequence that has been encoded by 8B/10B coding is represented by Equation (1) when the abundance ratio of "1" and "0" is 1:1:

$$Vex=(VH+VL)/2 \qquad (1)$$

where VH is the potential corresponding to "1" and VL is the potential corresponding to "0". In addition, when encoding is carried out by coding circuit 1 such that the abundance ratio of "1" and "0" is m:n, mean potential Vex of a data sequence after this encoding is represented by Equation (2):

$$Vex=((m \times VH)+(n \times VL))/(m+n) \qquad (2)$$

A data sequence that has been encoded by coding circuit 1 is transmitted by drive circuit 2 by way of transmission path 102 such as a PCB (Printed Circuit Board) or cable. Signal detection circuit 3 of reception circuit 101 detects each of the values "1" or "0" from the signal that is received by way of transmission path 102. Transmission path 102 is not limited to a PCB or cable, and any means capable of transmitting a data signal may be used.

When an offset voltage is assumed not to exist in signal detection circuit 3, the output voltage of averaging circuit 4 should equal the above-described mean potential Vex. In actuality, however, offset voltage is present in signal detection circuit 3, and the abundance ratio of "1" and "0" therefore does not become uniform for a data sequence that is supplied as output from signal detection circuit 3 despite encoding by, for example, 8B/10B code. In other words, the abundance ratio of one of "1" and "0" increases and a difference occurs between the output voltage of averaging circuit 4 and the above-described mean potential Vex.

In the present embodiment, the above-described mean potential Vex is applied as the expected value to comparison circuit 5 and the output signal of comparison circuit 5 is fed back to signal detection circuit 3 to implement control such that the difference between the expected value and the output potential of averaging circuit 4 becomes "0," and the abundance ratio of "1" and "0" that is detected at signal detection circuit 3 is caused to match the abundance ratio of "1" and "0" of the data sequence that is generated at coding circuit 1, whereby the offset voltage of signal detection circuit 3 is corrected.

In the present invention, averaging circuit 4 and signal conversion circuit 7 are included in the feedback loop for correcting the offset voltage, and the offset voltages of these circuits are therefore corrected together. In addition, the present invention has the effect of further enabling the combined correction of the offset voltage resulting from the influence of coding circuit 1 and drive circuit 2 that are provided in transmission circuit 100 and transmission path 102.

The offset voltage of signal detection circuit can therefore be corrected while receiving signals by receiving a data sequence that has been encoded such that the abundance ratios of each of the values of a prescribed data length are uniform and then implementing control such that the abundance ratios of each value of the data sequence that is supplied from signal detection circuit 3 match the abundance ratios of each value of the data sequence generated in coding circuit 1. In addition, because the data sequence that is transmitted is used in the correction of the offset voltage, fluctuations in the offset voltage of signal detection circuit 3 that occur during data transmission can also be corrected. Still further, increase of the circuit scale or decrease of the communication speed are prevented because there is no need for circuits for generating an adjustment pattern or a dedicated training sequence for correcting the offset voltage of signal detection circuit 3.

The expected value that is supplied to comparison circuit 5 may be generated using VH and VL according to the above-described Equation (1) or Equation (2). Here, VH is equal to the power-supply voltage Vdd supplied to the signal detection circuit or comparison circuit 5, and VL is equal to the ground voltage of the signal detection circuit or comparison circuit 5. However, the power-supply voltage that is supplied to comparison circuit 5 varies according to the wiring path or distance from the power supply, and the expected value is therefore preferably generated while taking these variations into consideration.

FIGS. 2A and 2B are circuit diagrams showing an example of the expected value generation circuit shown in FIG. 1. FIGS. 2A and 2B show an example of a circuit in which VH=Vdd (power-supply voltage), VL=Gnd (ground voltage), and the abundance ratio of "1" and "0" of a data sequence after encoding is 1:2.

FIG. 2A is an example of a circuit for generating the expected value of ⅔ Vdd using field-effect transistors, and FIG. 2B is an example of a circuit for generating the expected value of ⅔ Vdd using resistors. As shown in FIGS. 2A and 2B, error in the expected value with respect to fluctuation of the power-supply voltage supplied to comparison circuit 5 can be decreased by using power-supply voltage Vdd and ground voltage Gnd to generate the expected value.

In addition, averaging circuit 4 implements averaging of a data sequence supplied from signal detection circuit 3 for each data length equal to or greater than the encoding data length used in encoding. This data length that is used in averaging is set to a natural-number multiple of the encoding data length.

Coding circuit 1 achieves an asymptotic approach of the abundance ratio of each value following encoding to m:n by repeatedly encoding a data sequence that is the object of transmission in encoding data-length units. For example, in 8B/10B coding, the difference between the numbers of "1" and "0" asymptotically approaches "0" by both converting 8 bits (1 Byte) of data to 10 bits of data and altering transmitted data based on the value of the above-described running disparity.

Averaging circuit 4 implements averaging of a data sequence that is supplied as output from signal detection circuit 3 for each prescribed data length, but this prescribed data length is preferably set to a data length necessary for causing the difference between the expected value and the mean potential of a data sequence after encoding to become equal to or less than the offset voltage that can be tolerated in signal detection circuit 3.

For example, when encoding is carried out by 8B/10B coding such that the abundance ratio of "1" and "0" is 1:1, the power-supply voltage of reception circuit 101 set to 1V, and Vex=0.5V supplied as the expected value, and further, if the permissible offset voltage at signal detection circuit 3 is assumed to be 5 mV, averaging circuit 4 should carry out averaging for each data length such that the mean potential of a data sequence after encoding is no greater than 0.505V, i.e., such that the difference between the mean potential of a data sequence after encoding and the expected value is no greater than 5 mV.

FIG. 3 shows the transition of the divergence between the expected value and the mean potential of a data sequence after encoding with respect to the number of bits (communication data length) of a data sequence after encoding when the abundance ratio of "1" and "0" in the first encoding data length was 7:3.

In 8B/10B, it is known that the abundance ratio of "1" and "0" in an encoding data length starts from a maximum of 7:3.

In this case, the difference between the expected value and the mean potential of a data sequence after encoding becomes no greater than 5 mV when the communication data length is at least 400 bits, and it can be seen that averaging circuit 4 should supply the mean potential of a data sequence for at least each 400 bits.

Using FIGS. 4-7, explanation next regards a working example of the data transmission system of the first embodiment shown in FIG. 1.

FIG. 4 is a block diagram showing an example in which a flip-flop is used in the signal detection circuit shown in FIG. 1, and FIG. 5 is a block diagram showing an example in which an amplification circuit is used in the signal detection circuit shown in FIG. 1. FIG. 6 is a block diagram showing an example in which a sampling latch is used in the signal detection circuit shown in FIG. 1, and FIG. 7 is a circuit diagram showing an example of the configuration of the sampling latch shown in FIG. 6.

FIG. 4 is a configuration that includes flip-flop 8 in signal detection circuit 3 and in which "1" or "0" is detected from a data sequence that has been received by way of transmission path 102 and the result supplied as output.

FIG. 5 is a configuration that includes amplification circuit 11 and flip-flop 12 in signal detection circuit 3 and in which a data sequence that has been received by way of transmission path 102 is amplified in amplification circuit 11 and "1" or "0" is detected by flip-flop 12 from the signal following amplification and supplied as output. Signal detection circuit 3 that includes amplification circuit 11 shown in FIG. 5 can also be applied to a case in which the amplification of a received signal is smaller than in signal detection circuit 3 that includes only flip-flop 8 shown in FIG. 4.

FIG. 6 is a configuration that includes sampling latch 9 and flip-flop 10 in signal detection circuit 3 in which "1" or "0" is detected by sampling latch 9 from the signal received by way of transmission path 102 and supplied as output.

As shown in FIG. 7, sampling latch 9 is a latch circuit that detects the difference in potential of two signals that are received as input and that amplifies the difference in potential to the power-supply voltage and supplies the result. Sampling latch 9 shown in FIG. 7 amplifies the difference in potential between a signal received at input terminal REF and a signal received as input at input terminal IN to the power-supply voltage at the timing of clock CLK, holds the result, and supplies the result from output terminals OUT and OUTB signals following amplification at the timing of clock CLKB. The signal received by way of transmission path 102 is applied as input to input terminal IN, and a reference voltage REF used for determining "1" or "0" from the potential of the received signal is applied as input to input terminal REF.

Compared to the configuration shown in FIG. 5 in which amplification circuit 11 is provided, a configuration in which sampling latch 9 is provided in signal detection circuit 3 shown in FIG. 6 has the features of consuming less power and enabling detection of a lower minimum input difference in potential. In addition, when used combined with the de-multiplexer to be described hereinbelow, this configuration has the effect of enabling high-accuracy detection of "1" or "0" from high-speed received signals. Sampling latch 9 is not limited to the circuit configuration shown in FIG. 7 and may be of a configuration that uses, for example, transistors, or may be provided with any balanced-input circuit.

FIG. 8 is a block diagram showing an example in which an integration circuit is used in the averaging circuit shown in FIG. 1.

As shown in FIG. 8, integration circuit 13 can be used in averaging circuit 4. In this type of configuration, the integration potential (=the mean potential of the output signal of signal detection circuit 3) that is supplied from integration circuit 13 and the potential of the expected value determined from potentials VH and VL assigned to "1" and "0" along with the abundance ratio of "1" and "0" of a data sequence after encoding are compared at comparison circuit 5, and the comparison result is fed back to signal detection circuit 3 to enable correction of the offset voltage of signal detection circuit 3.

Signal detection circuit 3 shown in FIG. 8 assumes a configuration that operates according to an offset control signal composed of a digital signal, and is therefore of a configuration in which the analog signal supplied from comparison circuit 5 is converted to a digital signal by using A/D conversion circuit 14 and fed back to signal detection circuit 3. When a digital signal is used as the offset control signal, the offset control signal can be made up from a plurality of bits.

Second Embodiment

In the second embodiment, an example is shown in which averaging circuit 4 and comparison circuit 5 that belong to reception circuit 101 of the first embodiment shown in FIG. 1 are realized by digital signal processing.

As shown in FIG. 9, the functions of averaging circuit 4 and comparison circuit 5 can be realized by digital signal processing by, upon reception of a data sequence in which the abundance ratio of "1" and "0" realized by encoding is 1:1, counting either one of "1" and "0" that are detected from the received signal by counter 16 and comparing in comparison circuit 5 to determine if this value is greater than one-half the data length used in averaging.

When coding circuit 1 carries out coding in which the occurrence ratio of "1" and "0" is m:n and the data length used in averaging is "1," the expected value when "1" is counted in counter 16 is:

$$(m/(m+n)) \times 1 \quad (3)$$

and the expected value when "0" is counted in counter 16 is:

$$(n/(m+n)) \times 1 \quad (4)$$

FIG. 10 is an example in which either one of "1" and "0" detected by signal detection circuit 3 is counted using shift register 15 of k (where k is a natural number) bits and counter 16 of k bits and comparison then carried out in comparison circuit 5 to determine whether this value is greater than the expected value. The bit number k of shift register 15 is determined according to the type of code used in encoding the data sequence. FIG. 11 is an example in which sampling latch 9 and flip-flop 10 are used in signal detection circuit 3 shown in FIG. 10.

The comparison result supplied from comparison circuit 5 is converted to an analog signal (offset control signal) by D/A conversion circuit 17 and fed back to signal detection circuit 3.

In the first embodiment, the comparison of the mean value (or integrated value) of the output voltage of signal detection circuit 3 and the expected value is realized by comparing analog voltages, and a precision device having extremely small offset voltage must therefore be used in comparison circuit 5. The concern therefore arises that reception circuit 101 will require considerable design time and expense.

On the other hand, when the functions of averaging circuit 4 and comparison circuit 5 are realized by digital signal processing, digital data are applied as the expected value or count values to comparison circuit 5 and the difference in potential of the input signals is therefore extremely great compared to a case of comparing analog signals and the accuracy of the comparison results can be increased. In addition, high accuracy is not required of counter 16 and comparison circuit 5, and increase in the design time and costs can therefore be avoided.

Third Embodiment

In the above-described first embodiment and second embodiment, methods were shown for correcting the offset voltage of signal detection circuit 3 when transmitting a data sequence by single-end transmission. In the third embodiment, a method is proposed for correcting offset voltage of signal detection circuit 3 when transmitting a data sequence by differential transmission. In the following explanation, an example is described in which, similar to the second embodiment, averaging circuit 4 and comparison circuit 5 that belong to reception circuit 101 are both realized by digital signal processing. However, the third embodiment can also be applied to a configuration in which averaging circuit 4 and comparison circuit 5 are realized by analog circuits, as shown in the first embodiment.

As shown in FIG. 12, because a data sequence is transmitted by a differential signal, the data transmission system of the third embodiment is of a configuration in which the drive circuit included in transmission circuit 100 shown in FIG. 11 is replaced by differential drive circuit 20, transmission path 102 is made up of two paths, and differential sampling latch 21 is used in signal detection circuit 3 included in reception circuit 101.

As shown in FIG. 13, differential sampling latch 21 is of the same configuration as the sampling latch shown in FIG. 7 and is a latch circuit that detects the difference in potential of the two signals received as input, amplifies this difference in potential to the power-supply voltage, and supplies the result. Differential sampling latch 21 shown in FIG. 13 amplifies and holds the difference in potential between the signal received as input at input terminal IN and the signal received as input at input terminal INB to the power-supply voltage at the timing of clock CLK and supplies the signal following amplification from output terminals OUT and OUTB at the timing of clock CLKB. One signal received by way of transmission path 102 is applied as input to input terminal IN and the other signal received by way of transmission path 102 is applied as input to input terminal INB.

Fourth Embodiment

Explanation next regards the fourth embodiment of the data transmission system of the present invention.

The fourth embodiment is a case in which the data transmission system shown in the third embodiment is applied to serial signal transmission. The following explanation regards an example in which averaging circuit 4 and comparison circuit 5 included in reception circuit 101 are both realized by digital signal processing, similar to the second embodiment and the third embodiment. However, the fourth embodiment can also be applied to a configuration in which averaging circuit 4 and comparison circuit 5 are realized by analog circuits as shown in the first embodiment.

As shown in FIG. 14, the data transmission system of the fourth embodiment is of a configuration provided with multiplexer (hereinbelow abbreviated as "MUX") 22 in transmission circuit 100 and demultiplexer (hereinbelow abbreviated as "DEMUX") 23 in reception circuit 101.

MUX 22 converts a plurality of data sequences following encoding (parallel data) to serial data by alternately supplying output for each bit. The serial data following conversion are transmitted by differential drive circuit 20 by way of two transmission paths 102 and received in differential sampling latch 21 provided in reception circuit 101. The output signal of differential sampling latch 21 is held in flip-flop 19, and this output is converted to parallel data in DEMUX 23. FIG. 14 shows a configuration in which a 1:4 DEMUX is used as DEMUX 23, but a 1:i DEMUX (where i is a natural number) can also be used.

In the configuration shown in FIG. 14, the flip-flop group provided in DEMUX 23 is used as a means of realizing the same function as shift register 15 shown in FIG. 10. In the data sequence supplied as output from DEMUX 23, the number of "1" for each data length of, for example, 40 bits is counted by counter 24, and the result of comparison with value "20" that has been calculated as the expected value is supplied as output from comparison circuit 5.

As shown in FIG. 15, equalizer 18 for shaping the signal waveform received by way of transmission path 102 may be provided in the section preceding differential sampling latch 21 of reception circuit 101. Equalizer 18 is not limited to the configuration shown in FIG. 15 and can be applied in all of the data transmission systems shown in the first to fourth embodiments.

The data transmission system shown in FIG. 16 is an example in which two differential sampling latches connected in parallel are used in signal detection circuit 3. In this type of configuration, the offset voltages of differential sampling latches 29 and 30 are different and the offset voltages must therefore be corrected separately. The following explanation regards the method of correction.

In the data transmission system shown in FIG. 16, two coding circuits 25 and 26 are provided in transmission circuit 100, and encoding is carried out in each such that the abundance ratios of "1" and "0" for each transmission system are equal. MUX 27 performs parallel/serial conversion (multiplexing) to alternately supply for each bit the data that have been encoded in coding circuits 25 and 26. In FIG. 16, a configuration is shown that uses a 2:1 MUX to convert two signals to one signal, but a configuration that uses a j:1 MUX (where j is a natural number) is also possible. The serial data that are supplied from MUX 27 are transmitted by differential drive circuit 20 by way of two transmission paths 102.

Reception circuit 101 parallel-receives the received signal by means of differential sampling latch 29 and differential sampling latch 30. Differential sampling latch 29 and differential sampling latch 30 alternately sample the received signal by each bit and restore the signals to the each of the data sequences that preceded encoding in coding circuits 25 and 26.

The data sequences supplied from differential sampling latch 29 and differential sampling latch 30 are supplied in parallel in prescribed bit units (demultiplexed) in DEMUX 31 and DEMUX 32. FIG. 16 shows an example in which 1:4 DEMUX are used for converting one signal to four signals, but the output bit number of DEMUX may be of any number. DEMUX are provided in a number equal to the number j of converted signals of MUX included in transmission circuit 100.

Counters 33 and 34 count the number of "1" for each data length of, for example, 20 bits from the data supplied from DEMUX 31 and 32. In this case, the data length that is counted should be at least 10 bits, and the object of counting can be either "1" or "0." The results of counting of counters 33 and 34 are compared with the expected value in comparison circuits 35 and 36, and fed back to the differential sampling latches 29 and 30.

As shown in FIG. 16, even when a plurality of data sequences are transmitted, each of the data sequences are encoded, converted to a serial signal by a MUX and transmitted, following which the received serial signal is received by a plurality of sampling latches that are connected in parallel and restored to the data sequences that preceded encoding, the "1" or "0" of each data sequence are counted and compared with an expected value, and the results of comparison fed back to signal detection circuit 3, whereby the offset voltages of a plurality of signal detection circuits 3 (sampling latches) can be corrected.

The invention claimed is:

1. A data transmission system comprising:
   a transmission circuit for generating and transmitting a data sequence in which an abundance ratio of each value is fixed for each prescribed data length; and
   a reception circuit for correcting the offset voltage of a signal detection circuit that detects said values based on the abundance ratio of each value of said data sequence transmitted from said transmission circuit.

2. The data transmission system according to claim 1, wherein said transmission circuit includes:
   a coding circuit for encoding a data sequence that is the object of transmission and generating a data sequence in which the abundance ratio of each value of said prescribed data length is fixed.

3. The data transmission system according to claim 1, wherein said reception circuit includes:
   a comparison circuit for comparing the abundance ratio of each value of a data sequence supplied from said signal detection circuit and an expected value that is based on the abundance ratio of each value of the data sequence generated in said transmission circuit and feeding back to said signal detection circuit an offset control signal for causing these values to match.

4. The data transmission system according to claim 3, wherein:

$Vex=((m \times VH)+(n \times VL))/(m+n)$ where m:n is the abundance ratio of "1" and "0" that are values of a data sequence transmitted from said transmission circuit, VH is a potential assigned to "1" and VL is a potential assigned to "0," "1" and "0" being values of the data sequence supplied from said signal detection circuit, and Vex is said expected value.

5. The data transmission system according to claim 3, wherein:
   said reception circuit includes a counter for counting any value for each prescribed data length of a data sequence supplied from said signal detection circuit; and
   said comparison circuit compares the output value of said counter with said expected value.

6. The data transmission system according to claim 1, wherein said reception circuit includes an averaging circuit for supplying as output a mean potential of a data sequence supplied from said signal detection circuit.

7. The data transmission system according to claim 6, wherein said averaging circuit supplies as output a mean potential of a data sequence supplied from said signal detection circuit for each data length that is a natural-number multiple of an encoding data length that is a processing unit of encoding.

8. The data transmission system according to claim 1, wherein said transmission circuit includes:
   a plurality of coding circuits for encoding a data sequence that is the object of transmission and generating a data sequence in which the abundance ratio of each value for each said prescribed data length is fixed;
   a multiplexer for converting to serial data by alternately supplying for each bit a data sequence generated in said coding circuits; and
   a differential drive circuit for effecting the differential transmission of said data sequence.

9. The data transmission system according to claim 8, wherein said reception circuit includes:
   a plurality of signal detection circuits connected in parallel for receiving data sequences supplied from said multiplexer in respective balanced-input circuits and restoring each of data sequences generated by said plurality of coding circuits;
   a plurality of demultiplexers for implementing parallel output for each of prescribed bits a data sequence supplied from said plurality of signal detection circuits;
   a plurality of counters for counting any value of said data sequence from output of said demultiplexers; and
   a plurality of comparison circuits for comparing output values of said counters with said expected value and feeding back offset control signals to corresponding signal detection circuits for causing these values to match.

10. The data transmission system according to claim 9, wherein, when said prescribed data length is 1 and the abundance ratio of "1" and "0" that are values of a data sequence supplied from said transmission circuit is m:n, said expected value is:

$(m/(m+n)) \times 1$ when said counter counts said "1," and said expected value is:

$(n/(m+n)) \times 1$ when said counter counts said "0."

11. The data transmission system according to claim 1, wherein said coding circuit encodes said data sequence that is the object of transmission by means of 8B/10B coding.

12. A reception circuit comprising:
    a signal detection circuit for receiving a data sequence in which the abundance ratio of each value for each prescribed data length is fixed and detecting each value of said data sequence; and
    an offset correction means for correcting an offset voltage of said signal detection circuit based on the abundance ratio of each value of said data sequence.

13. The reception circuit according to claim 12, further comprising a comparison circuit for comparing an abundance ratio of each value of a data sequence supplied from said signal detection circuit and an expected value based on the abundance ratio of each value of a data sequence received in said signal detection circuit and for feeding back to said signal detection circuit an offset control signal for causing these values to match.

14. The reception circuit according to claim 13, wherein:

$Vex=((m \times VH)+(n \times VL))/(m+n)$ where m:n is the abundance ratio of "1" and "0" that are values of a data sequence received in said signal detection circuit, VH is a potential assigned to "1" and VL is a potential assigned to "0," "1" and "0" being values of the data sequence supplied from said signal detection circuit, and Vex is said expected value.

15. The reception circuit according to claim 13, further comprising a counter for counting for each prescribed data length any value of a data sequence supplied from said signal detection circuit;

wherein said comparison circuit compares the output value of said counter with said expected value.

16. The reception circuit according to claim 15, wherein, when said prescribed data length is 1 and the abundance ratio of "1" and "0" that are values of a data sequence received in said signal detection circuits is m:n, said expected value is:

$(m/(m+n)) \times 1$ when said counters count said "1," and said expected value is:

$(n/(m+n)) \times 1$ when said counters count said "0."

17. The reception circuit according to claim 13, comprising:

a plurality of signal detection circuits connected in parallel for receiving data sequences in respective balanced-input circuits;

a plurality of demultiplexers for implementing parallel output for each prescribed bit of data sequences supplied from said plurality of signal detection circuits;

a plurality of counters for counting any value of said data sequences from output of said demultiplexers; and a plurality of comparison circuits for comparing the output values of said counters and said expected value and feeding back to corresponding signal detection circuits offset control signals for causing these values to match.

* * * * *